United States Patent [19]

Petschauer

[11] 3,906,200

[45] Sept. 16, 1975

[54] ERROR LOGGING IN SEMICONDUCTOR STORAGE UNITS

[75] Inventor: Richard J. Petschauer, Edina, Minn.

[73] Assignee: Sperry Rand Corporation, New York, N.Y.

[22] Filed: July 5, 1974

[21] Appl. No.: 486,033

[52] U.S. Cl. .................. 235/153 AK; 235/153 AM; 340/146.1 AX

[51] Int. Cl.² .................. G06F 11/12; G11C 29/00

[58] Field of Search ......... 235/153 AC, 153 AM, 235/153 AK; 340/172.5, 146.1 AX

[56] References Cited

UNITED STATES PATENTS

| | | | |
|---|---|---|---|
| 3,350,690 | 10/1967 | Rice | 340/172.5 |
| 3,659,088 | 4/1972 | Boisvert, Jr. | 235/153 AC |
| 3,704,363 | 11/1972 | Salmassy | 235/153 AK |
| 3,735,105 | 5/1973 | Maley | 235/153 AC |

*Primary Examiner*—Charles E. Atkinson
*Attorney, Agent, or Firm*—Kenneth T. Grace; Thomas J. Nikolai; Marshall M. Truex

[57] ABSTRACT

A maintenance procedure comprising a method of and an apparatus for storing information identifying the location of one or more defective bits, i.e., a defective memory element, a defective storage device or a failure, in a single-error-correcting semiconductor main storage unit (MSU) comprised of a plurality of large scale integrated (LSI) bit planes. The method utilizes an error logging store (ELS) comprised of 128 word-group-associated memory registers, each memory register storing 1 tag bit and 6 syndrome bits. Upon determination of a single bit error during the readout of a word from the MSU, stored in the ELS are: (1) a tag bit that when set signifies that a defective bit has been determined to be in the one associated word group; and, (2) a group of 6 syndrome bits that identifies the one of the 45, 1024 bit planes of the one associated word group that contains the defective bit. A defective device counter (DDC) counts the set tag bits in the ELS and is utilized by the machine operator to schedule preventative maintenance of the MSU by replacing the defective bit planes. By statistically determining the number of allowable failures, i.e., the number of correctable failures that may occur before the expected occurrence of a noncorrectable double bit error, preventative maintenance may be scheduled only as required by the particular MSU.

6 Claims, 4 Drawing Figures

ERROR LOGGING IN SEMICONDUCTOR STORAGE UNITS

BACKGROUND OF THE INVENTION

Semiconductor storage units made by large scale integrated circuit techniques have proven to be cost-effective for certain applications of storing digital information. Most storage units are comprised of a plurality of similar storage devices or bit planes each of which is organized to contain as many storage cells or bits as feasible in order to reduce per bit costs and to also contain addressing, read and write circuits in order to minimize the number of connections to each storage device. In many designs, this has resulted in an optimum storage device or bit plane that is organized as N words of 1 bit each, where N is some power of 2, typically, 256, 1024 or 4096. Because of the 1 bit organization of the storage device, single bit error correction as described by Hamming in the publication Error Detecting and Correcting Codes, R. W. Hamming, The Bell System Journal, Vol. XXIX, April, 1950, No. 2, pp. 147–160, has proven quite effective in allowing partial or complete failure of a single storage cell or bit in a given word, i.e., a single bit error, the word being of a size equal to the word capacity of the storage device, without causing loss of data readout from the storage unit. This increases the effective mean-time-between-failure (MTBF) of the storage unit.

Because the storage devices are quite complex, and because many are used in a semiconductor storage unit, they usually represent the predominant component failure in a storage unit. Consequently, it is common practice to employ some form of single bit error correction along the lines described by Hamming. While single bit error correction allows for tolerance of storage cell failures, as more of them fail the statistical chance of finding two of them, i.e., a double bit error, in the same word increases. Since two failing storage cells in the same word cannot be corrected, it would be desirable to replace all defective storage devices before this occurred, such as at a time when the storage unit would not be in use but assigned to routine preventative maintenance.

While it would be possible to replace each defective storage device shortly after it failed, this normally would not be necessary. It would be more economical to defer replacement until several storage devices were defective thereby achieving a better balance between repair costs and the probability of getting a double failure in a given word. One technique for doing this is to use the central processor to which the storage unit is connected to do this as one of its many other tasks under its normal logic and program control. However, this use of processor time effectively slows down the processor for its intended purpose since time must be allocated to log errors from the storage unit. The effect of this can be better understood when it is noted that a complete failure of a storage device in an often-used section of the storage unit may require a single error to be reported every storage cycle. Since the processor may need several storage cycles to process the error log a great loss of performance would result. One method which has been used to alleviate this is to sample only part of the errors, but this causes lack of logging completeness.

The novel procedure described herein alleviates the above problem by not reporting the same defective device every time it is read out. This procedure also has the advantage that no modifications need to be made to the central processor when a storage unit is replaced with one that uses error correction. This allows, for example, the inclusion of error correction in a storage unit and connection of it to an existing or in-use processor without any changes to the processor at installation time.

DESCRIPTION OF THE PREFERRED EMBODIMENT

Figure 1:
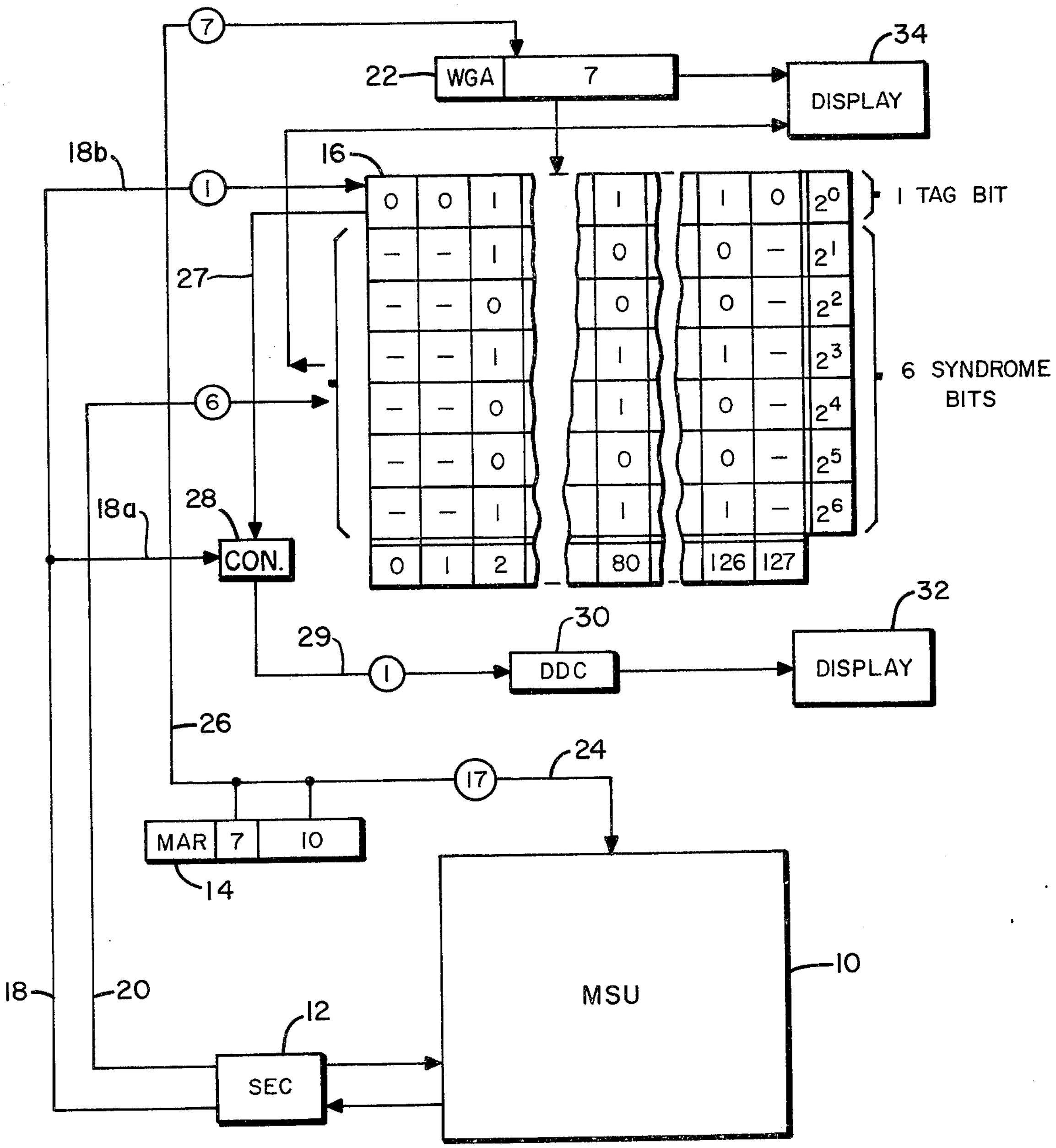
FIG. 1 is an illustration of a memory system incorporating the present invention.

With particular reference to FIG. 1 there is illustrated a memory system incorporating the present invention. The Main Storage Unit (MSU) 10 is of a well-known design configured according to FIG. 2. MSU 10 is a semiconductor memory having 131K words each of 45 bits in length containing 38 data bits and 7 check bits. MSU 10 is organized into 128 word groups each word group having 45 bit planes, each bit plane being a large scale integrated (LSI) plane of 1024 bits or memory locations. A semiconductor memory system that would define an exemplary Main Storage Unit (MSU) 10 and a Single Error Correction Circuit (SEC) 12 would be the Intel Corp. Part No. IN-1010. The like-ordered bit planes of each of the 128 word groups are also configured into 45 bit plane groups, each of 128 bit planes. Addressing of the MSU 10 is by concurrently selecting one out of the 128 word groups and one like-ordered bit out of the 1024 bits of each of the 45 bit planes in the one selected word group. This causes the simultaneous readout, i.e., in parallel, of the 45 like-ordered bits that constitute the one selected or addressed word.

Figure 3:
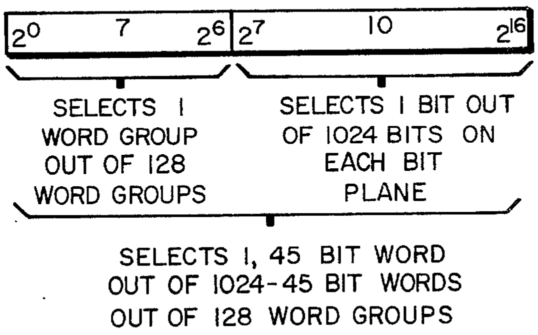
FIG. 3 is an illustration of the format of an address word utilized to address a word in the MSU of FIG. 1.

With particular reference to FIG. 3 there is illustrated the format of an address word utilized to select or address one word out of the 131K words stored in the MSU 10. In this configuration of the address word, the lower-ordered 7 bits, $2^0$–$2^6$, according to the 1's or 0's in the respective bit locations $2^0$–$2^6$, select one word group out of the 128 word groups while the higher-ordered 10 bits, $2^7$–$2^{16}$, select or address one bit of the 1024 bits on each of the 45 bit planes in the word group selected by the lower-ordered bits $2^0$–$2^6$.

MSU 10 utilizes a single error correction circuit (SEC) 12 — see the hereinabove cited publication of Hamming — for the determination and correction of single bit errors in each of the 45 bit words stored therein. Also illustrated is a memory address register (MAR) 14, such as that discussed above with particular reference to FIG. 3, for addressing or selecting one out of the 131K 45 bit words stored in MSU 10.

Figure 2:
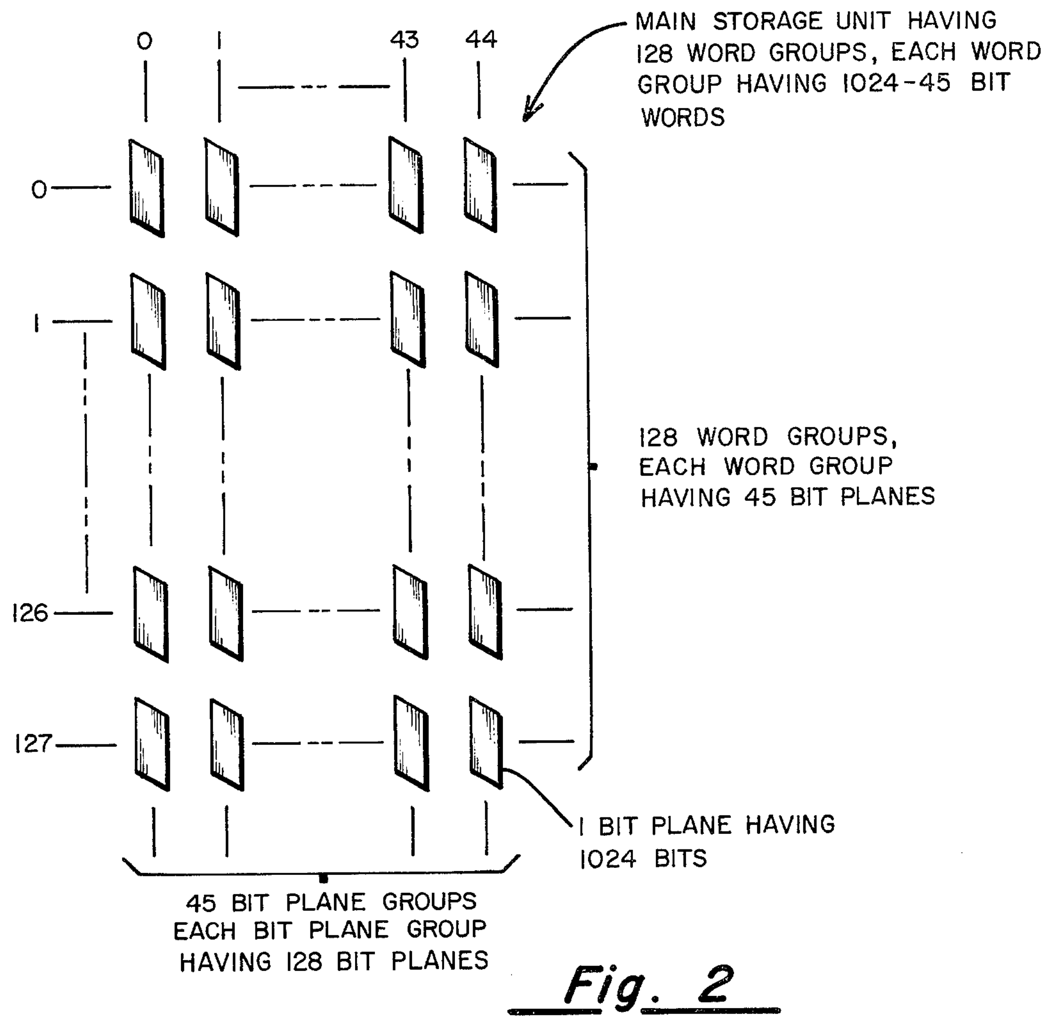
FIG. 2 is an illustration of how the replaceable 1024 bit planes are configured in the MSU of FIG. 1.

SEC 12 while correcting any single error in the word addressed in MSU 10 also generates an error word comprising two other signals: a tag bit or error signal, a 1 bit denoting an error condition or a 0 bit denoting no error condition; and 6 syndrome bits that identify the 1 bit plane group that contains the defective bit out of the 45 bit plane groups in which MSU 10 is configured as previously discussed with particular reference to FIG. 2. The 1 tag bit and the 6 syndrome bits generated by SEC 12 are as illustrated in FIG. 4.

In accordance with the present invention there is provided an error logging store (ELS) 16 for receiving and holding the single tag bit and the 6 syndrome bits generated by SEC 12. A semiconductor memory system that would define an exemplary Error Logging Store (ELS) 16 would be the Intel Corp. Part No. IN-3107. ELS 16 is preferably a LSI semiconductor memory array comprising 128 7-bit memory registers each memory register having a bit position $2^0$ for holding the tag bit (a 1 indicating a defective bit, or a 0 indicating no defective bit) and bit positions $2^1$–$2^6$ for holding the 6 syndrome bits that identify one of the 45 bit planes of the word group that is denoted by the associated memory register 0–127, each of the 128 memory registers being dedicated to represent the one like-ordered word group, i.e., memory register 2 represents word group 2 — see FIG. 2. As an example of the above ELS 16 is illustrated as having stored in its memory register 2 the 7-bit binary word

Figure 4:
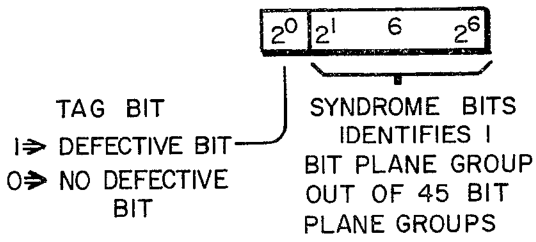
FIG. 4 is an illustration of the format of the tag bit and syndrome bits stored in the ELS of FIG. 1.

1101001 which, using the format of FIG. 4 and because the tag bit in bit position $2^0$ is a 1, denotes that bit plane 37 in word group 2 has a defective bit therein.

MSU 10, SEC 12 and MAR 14 operate to form a memory system that employs single error correction, i.e., any one bit in any one of the 131K 45-bit words if defective is correctable by SEC 12 permitting the associated data processing system to function as if no error had been detected; however, two or more errors, i.e., two or more bits in any one word being defective, are noncorrectable by SEC 12 requiring the associated data processing system to institute other error correcting procedures, e.g., to reload the erroneous data word back into MSU 10 from another source. In the present invention, ELS 16 is utilized to record what bit plane out of 128 × 45 bit planes the correctable single error was detected and corrected. That is, whenever a correctable single error is detected upon the readout of a word stored in MSU 10, SEC 12 operates to correct that error and to generate and to couple to line 18 an error signal that represents a single tag bit 1 and to line 20, 6 syndrome bits, per FIG. 4, that identify what one bit plane, containing 1024 bits, out of the 128 × 45 bit planes in MSU 10 the error was detected. MAR 14 by means of its 7 lower-ordered bits $2^0$–$2^6$ and word group address register (WGA) 22 addresses or selects in ELS 16 the one out of the 128 memory registers 0–127 that is dedicated to the one word group that contains the 1 bit plane in which the correctable single error was detected by SEC 12.

As an example, assume that SEC 12 detects that a single error has occurred upon the readout of the 45 bit word from MSU 10 as addressed by MAR 14 via line 24. If MAR 14 contains the multi-bit address word

0100000 the lower-ordered bits $2^0$–$2^6$ are transferred to WGA 22 via line 26 selecting ELS 16 memory register or address 2. Then, SEC. 12, via line 18*b*, couples the single tag bit 1 to the tag bit position $2^0$ of memory register 2 of ELS 16 — indicating that a correctable error has been detected in word group 2 of MSU 10 (see FIG. 2) — and via line 20 couples the 6 syndrome bits

101001 to the syndrome bit positions $2^1$–$2^6$ of memory register 2 of ELS 16 indicating that a correctable error has occurred in bit plane 37 (of word group 2).

In general then, each time a single error occurs, the error signal, via line 18*a*, would activate control (CON) 28 to, via chip select (CS) and write enable (WE) signals, interrogate ELS 16 using the lower-ordered 7 address bits in WGA 22 to address the one word group out of the 128 word groups that make up MSU 10, these 7 address bits would address from ELS 16 one of the 128 memory registers of 7 bits in length in which may be stored a single tag bit and 6 syndrome bits. Bit $2^0$ of the one addressed memory register of ELS 16, via line 27, would be compared by CON 28 to the error signal defining tag bit 1 from SEC 12, via line 18*a*. If bit $2^0$ were a 0 it, via line 18*b*, would be set to a 1 with the 6 syndrome bits from SEC 12, via line 20, then being stored in bit positions $2^1$–$2^6$ of the addressed memory register of ELS 16. The setting of the $2^0$ bit position to a 1 by CON 28 would also, via line 29, increment a defective device counter (DDC) 30 by a count of 1. Alternatively, if bit position $2^0$ had already contained a 1 (indicating that a defective bit in that 45 bit plane group had already been reported), CON 28 would not increment DDC 30 nor would it store the 6 syndrome bits in bit positions $2^1$–$2^6$ of the addressed memory register of ELS 16. Thus, upon determination of each correctable (single) error in MSU 10 by SEC 12, ELS 16 is addressed by WGA 22 to determine, by CON 28, if a correctable error has been previously determined to be in the one of the 45 bit plane groups in which the present correctable error has been detected. If not, tag bit $2^0$ would be set to a 1 and the syndrome bits $2^1$–$2^6$ in the address register of SEC 12 would, via line 20, be stored into the addressed memory register of ELS 16. Accordingly, DDC 30 would count and display by means of Display 32 the total number of bit plane groups in which one or more correctable (single) errors have been detected.

The primary purpose for error correction in a semiconductor memory, such as MSU 10, is to allow a permissible tolerance of failing semiconductor storage devices or bits. Further, the primary purpose of error logging in ELS 16 is to indicate when the number of defective devices increases to that point that a noncorrectable double error may occur such that preventative maintenance may be performed on the semiconductor memory (MSU) prior to the time such non-correctable double error may be expected (statistically) to occur. In the embodiment of FIG. 1 the error logging in ELS 16 provides information to the machine operator, by means of DDC 30 and Display 32 and Display 34, the number of correctable (single) erors that have occurred since the last preventative maintenance and the specific location of those correctable errors at the level of replaceable components as defined by the 1 bit plane within the 1 word group. Thus, the method of error logging as exemplified by FIG. 1 permits the machine operator to continuously monitor the number of correctable errors that have been detected, to determine in what replaceable component, such as a replacement LSI bit plane of 1024 bits, in which the correctable errors occurred and to schedule preventative maintenance prior to the expected occurrence of noncorrectable double errors within MSU 10.

What is claimed is:

1. In a procedure for scheduling preventative maintenance in a memory system that is configured into N bit planes and B bits per bit plane, each bit plane being a replaceable component that is replaced upon the detection of a defective device or bit therein, the method comprising:

arranging an error logging store to be comprised of a plurality of memory registers, each memory register representing an associated different one of said bit planes;

generating, upon the detection of a defective device in each bit plane, an error word that is associated with the bit plane in which the defective device is detected, said error word comprising a single tag bit;

testing the bit that is stored in the tag bit position of the memory register that is associated with the bit plane with which the generated error word is associated;

storing said generated error word in its associated one memory register of said error logging store;

generating a defective device count only if said test indicates that an error has not previously occurred in the associated one of said bit planes;

incrementing a defective device counter only upon the generation of each of said defective device counts;

monitoring said defective device counter; and, scheduling preventative maintenance of said memory system when said monitored defective device count reaches a predetermined magnitude.

2. In a procedure for scheduling preventative maintenance in a single error correction memory system that is configured into M word groups of N bit planes per word group and B bits per bit plane, each bit plane being a replaceable component upon the detection of a single defective device or bit therein that provides a correctable error upon readout, the method comprising:

arranging an error logging store to be comprised of M memory registers, each memory register dedicated to represent only an associated different one of said M word groups;

generating upon the detection of each correctable error a generated error word that is associated with the one of the M word group in which the correctable error is detected, said generated error word comprising a single tag bit and a plurality of syndrome bits, said tag bit indicating that a correctable error has occurred in said one of M word groups in the one of N bit planes that is identified by said syndrome bits;

comparing the tag bit of the generated error word to the bit that is stored in the tag bit position of the one of M memory registers that is dedicated to the one of M word groups to which the generated error word is associated;

storing said generated error word in its associated one of said M memory registers only if said comparison indicates that a correctable error has not previously occurred in the associated one of said M word groups;

generating a defective device count only if said comparison indicates that a correctable error has not previously occurred in the associated one of said M word groups;

incrementing a defective device counter upon the generation of each of said defective device counts;

monitoring said defective device counter; and, scheduling preventative maintenance of said memory system when said monitored defective device count reaches a predetermined magnitude.

3. In a procedure for scheduling preventative maintenance in a single error correction memory system that is configured into M word groups of N bit planes per word group and B bits per bit plane, each bit plane being a replaceable component upon the detection of a single defective device or bit therein that provides a correctable error upon readout, the method comprising:

arranging an error logging store to be comprised of M memory registers, each memory register dedicated to represent only an associated different one of said M word groups;

generating upon the detection of each correctable error a generated error word that is associated with the one of the M word groups in which the correctable error is detected, said generated error word comprising a single tag bit and a plurality of syndrome bits, said tag bit indicating that a correctable error has occurred in said one of M word groups in the one of N bit planes that is identified by said syndrome bits;

testing the bit that is stored in the tag bit position of the one of M memory registers that is dedicated to the one of M word groups to which the generated error word is associated;

storing said generated error word in its associated one of said M memory registers only if said test indicates that a correctable error has not previously occurred in the associated one of said M word groups;

generating an error signal only if said test indicates that a correctable error has not previously occurred in the associated one of said M word groups;

incrementing a defective device counter upon the generation of each of said error signals;

monitoring said defective device counter; and scheduling preventative maintenance of said memory system when said monitored defective device count reaches a predetermined magnitude.

4. In a data processing system that includes a memory system that is configured into N bit planes and B bits per bit plane, each bit plane being a replaceable component upon the detection of a single defective device or bit therein that provides an error upon readout, and error circuitry coupled to said memory system for generating, upon the detection of each of said errors in said memory system, an error word that is associated with only the one bit plane in which the error is detected, said error word comprising a single tag bit, said tag bit indicating that an error has occurred in said one bit plane, the improvement comprising:

an error logging store comprised of a plurality of memory registers each memory register dedicated to represent only an associated different one of said bit planes;

control means coupled to said error circuitry and said error logging store for testing the bit that is stored in the tag bit position of the one of said memory registers that is dedicated to the one of said bit planes to which the generated error word that is generated by said error circuitry is associated, said control means generating an error signal only if said test indicates that an error has not previously occurred in the associated one of said bit planes;

said control means storing said generated error word in its associated one of said memory registers of said error logging store only if said test indicates that an error has not previously occurred in the associated one of said bit planes;

defective device counter means responsively coupled to said control means for incrementing its count only upon the generation of said error signal;

display means responsively coupled to said defective device counter means for monitoring said error signals.

5. In a data processing system that includes an LSI semiconductor memory system that is configured into M word groups of N bit planes per word group and B bits per bit plane, each bit plane being a replaceable component upon the detection of a single defective device or bit therein that provides a correctable error upon readout and single error correction circuitry coupled to said memory system for generating upon the detection of each correctable error in said memory system a generated error word that is associated with the one of M word groups in which the correctable error is detected, said generated error word comprising a single tag bit and a plurality of syndrome bits, said tag bit indicating that a correctable error has occurred in said one of M word groups in the one bit plane that is identified by said syndrome bits, the improvement comprising:

an error logging store comprised of M memory registers, each memory register dedicated to represent only an associated different one of said M word groups;

control means responsively coupled to said single error correction circuitry and said error logging store for comparing the tag bit of the generated error word to the bit that is stored in the tag bit position of the one of the M memory registers that is dedicated to the one of the M word groups to which the generated error word is associated, said control means generating a defective device count only if said comparison indicates that a correctable error has not previously occurred in the associated one of said M word groups;

said control means transferring said generated error word from said single error correction circuitry to said error logging store for storing it in its associated one of said M memory registers of said error logging store only if said comparison indicates that a correctable error has not previously occurred in the associated one of said M word groups;

defective device counter means responsively coupled to said control means for incrementing its count only upon the generation of each of said defective device counts; and, display means responsively coupled to said defective device counter means for monitoring said defective device count.

6. In a data processing system that includes an LSI semiconductor memory system that is configured into M word groups of N bit planes per word group and B bits per bit plane, each bit plane being a replaceable component upon the detection of a single defective device or bit therein that provides a correctable error upon readout and single error correction circuitry coupled to said memory system for generating upon the detection of each correctable error in said memory system a generated error word that is associated with the one of M word groups in which the correctable error is detected, said generated error word comprising a single tag bit and a plurality of syndrome bits, said tag bit indicating that a correctable error has occurred in said one of M word groups in the one bit plane that is identified by said syndrome bits, the improvement comprising:

an error logging store comprised of M memory registers, each memory register dedicated to represent only an associated different one of said M word groups;

control means responsively coupled to said single error correction circuitry and said error logging store for testing the bit that is stored in the tag bit position of the one of the M memory registers that is dedicated to the one of the M word groups to which the generated error word is associated, said control means generating a defective device count only if said test indicates that a correctable error has not previously occurred in the associated one of said M word groups;

said control means transferring said generated error word from said single error correction circuitry to said error logging store for storing it in its associated one of said M memory registers of said error logging store only if said test indicates that a correctable error has not previously occurred in the associated one of said M word groups;

defective device counter means responsively coupled to said control means for incrementing its count only upon the generation of each of said defective device counts; and, display means responsively coupled to said defective device counter means for monitoring said defective device count.

* * * * *